(12) United States Patent
Takasu et al.

(10) Patent No.: US 12,062,222 B2
(45) Date of Patent: Aug. 13, 2024

(54) COMPUTER-READABLE STORAGE MEDIUM, IMAGE PROCESSING APPARATUS, AND METHOD FOR IMAGE PROCESSING

(71) Applicant: BROTHER KOGYO KABUSHIKI KAISHA, Nagoya (JP)

(72) Inventors: Masaya Takasu, Nagoya (JP); Chisato Inoue, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 379 days.

(21) Appl. No.: 17/516,195

(22) Filed: Nov. 1, 2021

(65) Prior Publication Data

US 2022/0189035 A1  Jun. 16, 2022

(30) Foreign Application Priority Data

Dec. 12, 2020  (JP) ................................. 2020-206379

(51) Int. Cl.
*G06V 10/75* (2022.01)
*B41J 29/38* (2006.01)
(Continued)

(52) U.S. Cl.
CPC ............ *G06V 10/751* (2022.01); *B41J 29/38* (2013.01); *G06K 15/027* (2013.01); *G06T 7/13* (2017.01)

(58) Field of Classification Search
CPC ...... G06V 10/751; G06V 10/44; G06V 20/52; B41J 29/38; G06K 15/027; G06T 7/13; G06T 2207/20021
See application file for complete search history.

(56) References Cited

U.S. PATENT DOCUMENTS

2009/0015681 A1* 1/2009 Pipkorn ............... H04N 23/959
348/E5.045
2009/0129674 A1* 5/2009 Lin .......................... G06T 7/13
382/173
(Continued)

FOREIGN PATENT DOCUMENTS

JP  H06-083961 A  3/1994
JP  H11-063959 A  3/1999
(Continued)

OTHER PUBLICATIONS

First U.S Office Action issued on Jan. 17, 2023, U.S. Appl. No. 17/516,094.

*Primary Examiner* — Edward F Urban
*Assistant Examiner* — Wassim Mahrouka
(74) *Attorney, Agent, or Firm* — Baker Botts L.L.P.

(57) ABSTRACT

A non-transitory computer readable storage medium storing computer readable instructions executable by a computer is provided. The computer readable instructions cause the computer to obtain subject image data composing a subject image, set larger regions and smaller regions in each of the larger regions in the subject image, calculate a first feature amount of each of the smaller regions with use of values of pixels in each of the smaller regions and a second feature amount of each of the larger regions with use of values of pixels in each of the larger regions, determine whether each of the smaller regions is an edge region including an edge based on a comparison between the first feature amount and the second feature amount, and generate edge image data indicating edges in the subject image with use of results of the determination whether each of the smaller regions is an edge region.

9 Claims, 10 Drawing Sheets

(51) Int. Cl.
*G06K 15/02* (2006.01)
*G06T 7/13* (2017.01)

(56) References Cited

U.S. PATENT DOCUMENTS

| | | | |
|---|---|---|---|
| 2011/0208477 | A1 | 8/2011 | Hitomi et al. |
| 2013/0002828 | A1 | 1/2013 | Ding et al. |
| 2016/0012304 | A1 | 1/2016 | Mayle et al. |
| 2017/0148154 | A1 | 5/2017 | Nakao |
| 2019/0355105 | A1* | 11/2019 | Rasmusson ............... G06T 5/80 |

FOREIGN PATENT DOCUMENTS

| | | |
|---|---|---|
| JP | 2006-113931 A | 4/2006 |
| JP | 2010-197336 A | 9/2010 |
| JP | 2012-009919 A | 1/2012 |
| JP | 2012-048593 A | 3/2012 |
| JP | 2013-114547 A | 6/2013 |
| JP | 2017-096750 A | 6/2017 |
| WO | 2010/052855 A1 | 5/2010 |

\* cited by examiner

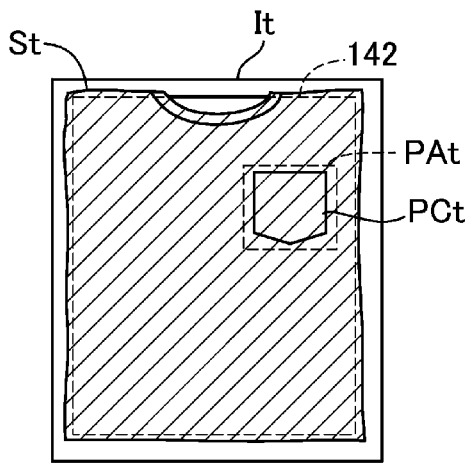
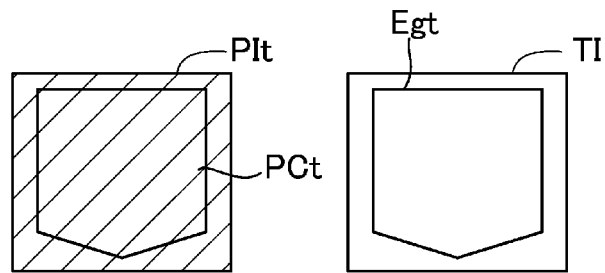
FIG. 4A  FIG. 4B  FIG. 4C
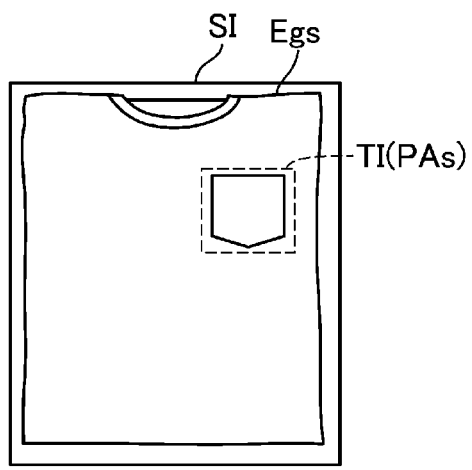
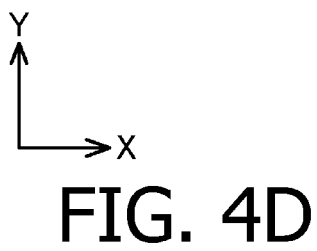
FIG. 4D  FIG. 4E PLAIN EDGE IMAGE
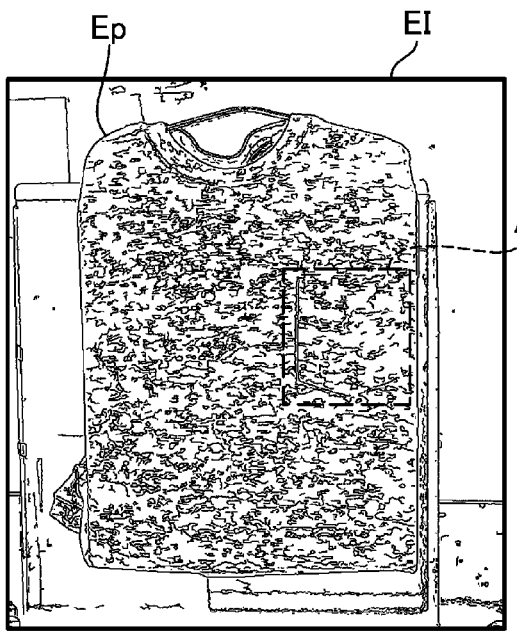
LOCAL EDGE REGION IMAGE
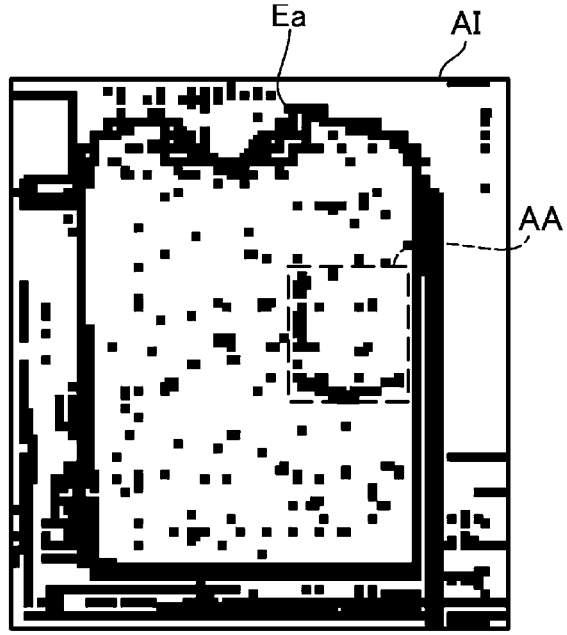
FIG. 6A
FIG. 6B
LOCAL EDGE IMAGE
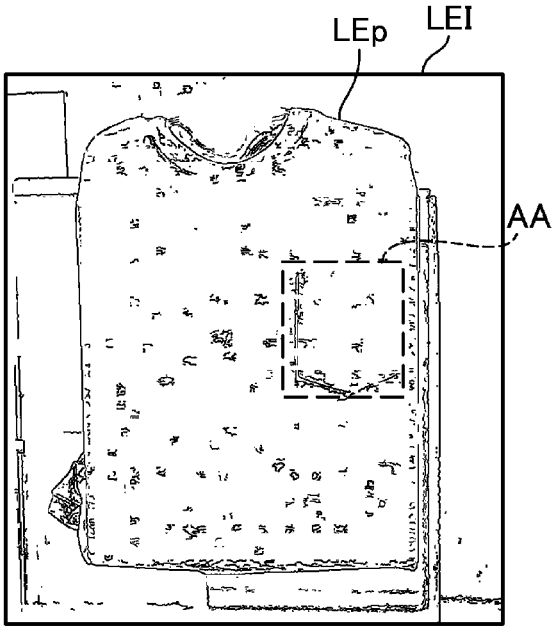
FIG. 6C

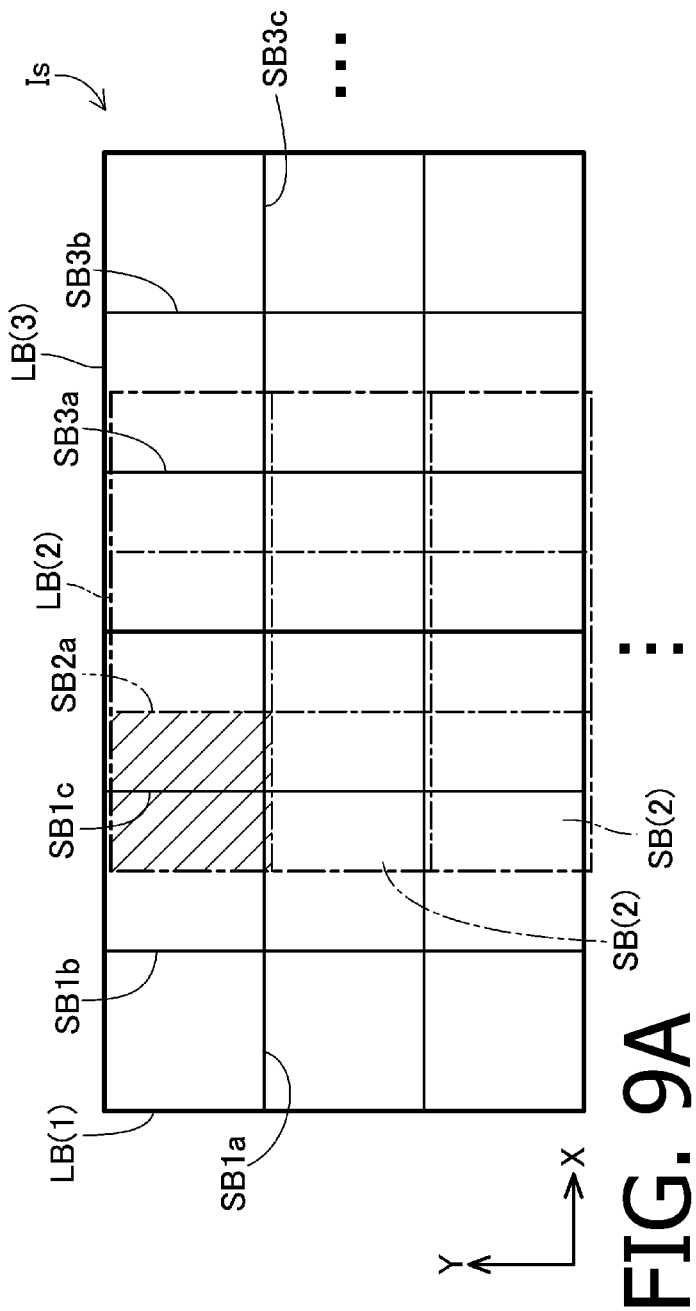

COMPUTER-READABLE STORAGE MEDIUM, IMAGE PROCESSING APPARATUS, AND METHOD FOR IMAGE PROCESSING

CROSS REFERENCE TO RELATED APPLICATIONS

This application claims priority under 35 U.S.C. § 119 from Japanese Patent Application No. 2020-206379, filed on Dec. 12, 2020, the entire subject matter of which is incorporated herein by reference.

BACKGROUND

The present disclosure is related to a technique for specifying edges of an object in an image.

A technique to specify edges of an object in an image is known. For example, an appearance-inspecting apparatus capable of specifying edges of an inspecting object in a captured image and edges of a model of the inspecting object in another image is known. The appearance-inspecting apparatus may compare the edges in the object in the captured image with the edges of the model to identify a position and a posture of the inspecting object in the captured image.

SUMMARY

However, the above known technique may not be designed with sufficient consideration to accurately specify the edges of the object. Therefore, for example, depending on composition of parts of the image that are different from the object of interest, many edges may be detected along with the edges of the object. With the unnecessary edges being detected, the edges of the object alone may not be accurately specified.

The present disclosure is advantageous in that a technique for specifying edges of an object in an image accurately, is provided.

According to an aspect of the present disclosure, a non-transitory computer readable storage medium storing computer readable instructions that are executable by a computer is provided. The computer readable instructions, when executed by the computer, cause the computer to obtain subject image data composing a subject image; set a plurality of larger regions and a plurality of smaller regions in each of the plurality of larger regions in the subject image with use of the subject image data, each of the plurality of smaller regions being smaller than the larger region in which the plurality of smaller regions are set, each of the plurality of larger regions including a plurality of pixels, each of the plurality of smaller regions including a plurality of pixels; calculate a first feature amount of each of the plurality of smaller regions and a second feature amount of each of the plurality of larger regions, the first feature amount being calculated with use of values of the plurality of pixels in each of the plurality of the smaller regions, the second feature amount being calculated with use of values of the plurality of pixels in each of the plurality of the larger regions; determine whether each of the plurality of smaller regions is an edge region including an edge based on a comparison between the first feature amount of the smaller region and the second feature amount of the larger region in which the smaller region is set; and generate edge image data indicating edges in the subject image with use of results of the determination whether each of the plurality of smaller regions is an edge region.

According to another aspect of the present disclosure, an image processing apparatus, including a memory configured to store data and a controller, is provided. The controller is configured to obtain subject image data composing a subject image; set a plurality of larger regions and a plurality of smaller regions in each of the plurality of larger regions in the subject image with use of the subject image data, each of the plurality of smaller regions being smaller than the larger region in which the plurality of smaller regions are set, each of the plurality of larger regions including a plurality of pixels, each of the plurality of smaller regions including a plurality of pixels; calculate a first feature amount of each of the plurality of smaller regions and a second feature amount of each of the plurality of larger regions, the first feature amount being calculated with use of values of the plurality of pixels in each of the plurality of the smaller regions, the second feature amount being calculated with use of values of the plurality of pixels in each of the plurality of the larger regions; determine whether each of the plurality of smaller regions is an edge region including an edge based on a comparison between the first feature amount of the smaller region and the second feature amount of the larger region in which the smaller region is set; and generate edge image data indicating edges in the subject image with use of results of the determination whether each of the plurality of smaller regions is an edge region.

According to another aspect of the present disclosure, a method to process images is provided. The method includes obtaining subject image data composing a subject image; setting a plurality of larger regions and a plurality of smaller regions in each of the plurality of larger regions in the subject image with use of the subject image data, each of the plurality of smaller regions being smaller than the larger region in which the plurality of smaller regions are set, each of the plurality of larger regions including a plurality of pixels, each of the plurality of smaller regions including a plurality of pixels; calculating a first feature amount of each of the plurality of smaller regions and a second feature amount of each of the plurality of larger regions, the first feature amount being calculated with use of values of the plurality of pixels in each of the plurality of the smaller regions, the second feature amount being calculated with use of values of the plurality of pixels in each of the plurality of the larger regions; determining whether each of the plurality of smaller regions is an edge region including an edge based on a comparison between the first feature amount of the smaller region and the second feature amount of the larger region in which the smaller region is set; and generating edge image data indicating edges in the subject image with use of results of the determination whether each of the plurality of smaller regions is an edge region.

BRIEF DESCRIPTION OF THE DRAWINGS

FIGS. 4A-4E are illustrative views of images to be used in the printing system 1000 according to the embodiment of the present disclosure.

FIGS. 6A-6C are illustrative views of images to be used in the pre-matching process in the printing system 1000 according to the embodiment of the present disclosure.

FIGS. 9A-9B are illustrative views of local edge region data according to the embodiment of the present disclosure.

DETAILED DESCRIPTION

In the following paragraphs, with reference to the accompanying drawings, an embodiment of the present disclosure will be described. It is noted that various connections may be set forth between elements in the following description. These connections in general and, unless specified otherwise, may be direct or indirect and that this specification is not intended to be limiting in this respect.

A. EMBODIMENT

A-1. Configuration of the Printing System 1000

Figure 1:
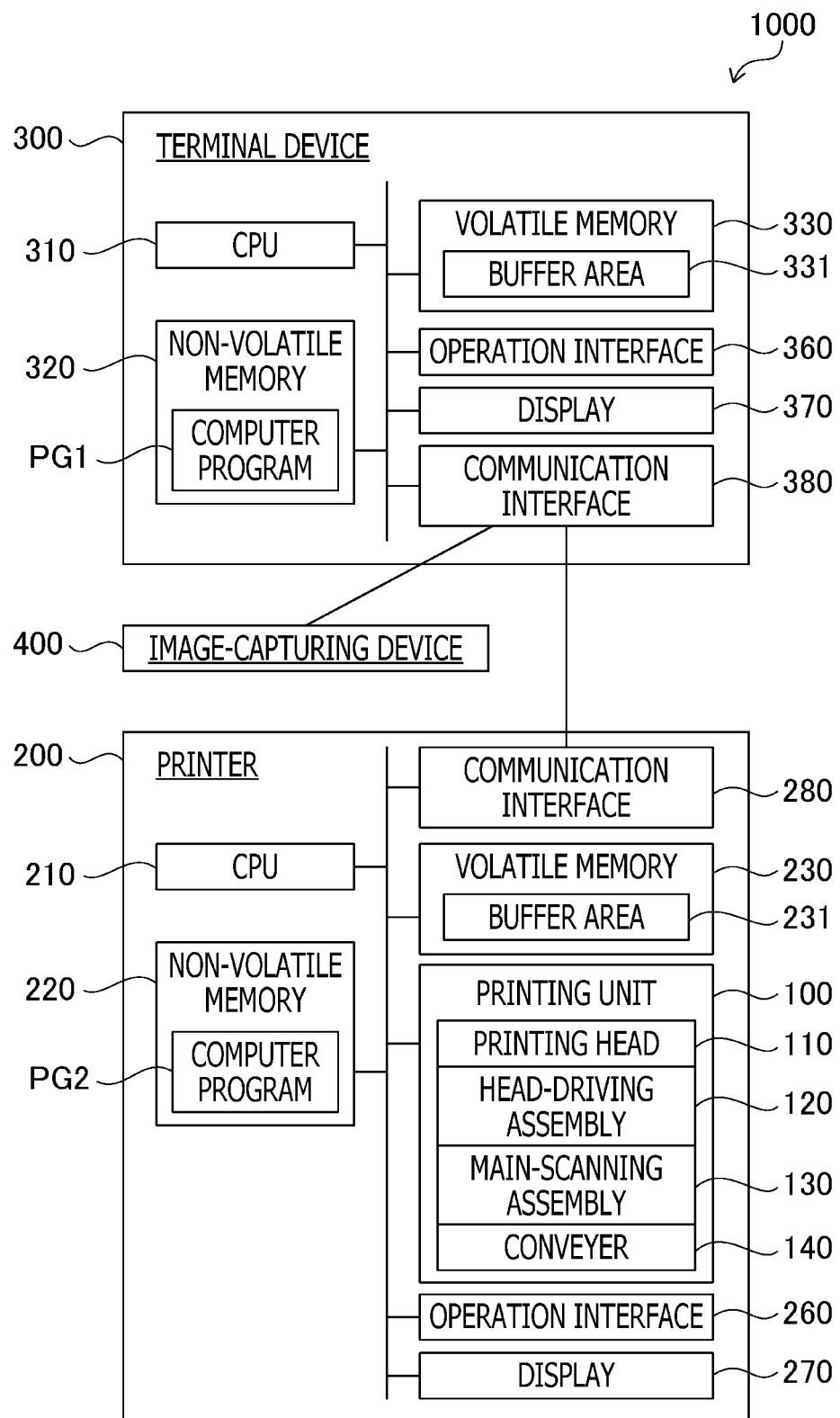
FIG. 1 is a block diagram to illustrate a configuration of a printing system 1000 according to an embodiment of the present disclosure.

The embodiment of the present disclosure will be described below. FIG. 1 is a block diagram to illustrate a configuration of the printing system 1000 according to the embodiment of the present disclosure. The printing system 1000 includes a printer 200, a terminal device 300, and an image-capturing device 400. The printer 200 and the terminal device 300 are connected to communicate with each other, and the image-capturing device 400 and the terminal device 300 are connected to communicate with each other.

The terminal device 300 is a computer, which may be used by a user of the printer 200, and may include, for example, a personal computer and a smart phone. The terminal device 300 has a CPU 310 being a controller of the terminal device 300, a non-volatile memory 320 such as a hard disk drive, a volatile memory 330 such as RAM, an operation interface 360 such as a mouse and a keyboard, a display 370 such as a liquid crystal display, and a communication interface 380. The communication interface 380 may include, for example, a wired and/or wireless interface, which enables communication with the printer 200 and the image-capturing device 400.

The volatile memory 330 has a buffer area 331 for temporarily storing various intermediate data generated when the CPU 310 processes data. The non-volatile memory 320 may store computer programs including a computer program PG1. The computer program PG1 may be provided by a manufacture of the printer 200 in a form of, for example, downloadable from a server or being stored in a medium such as, for example, a DVD-ROM. The CPU 310 executing the computer program PG1 may function as a printer driver to control the printer 200. The CPU 310 functioning as the printer driver may conduct, for example, a template registration process and a printing process, which will be described further below.

The image-capturing device 400 is a digital camera, which may optically capture an image of an object and generate image data to reproduce the image. In the following paragraphs, the generated image data of the captured image may be called as captured-image data. The image-capturing device 400 may generate and transmit the captured-image data to the terminal device 300 under control of the terminal device 300.

The printer 200 includes, for example, a printing unit 100, a CPU 210 being a controller of the printer 200, a non-volatile memory 220 such as a hard disk drive, a volatile memory 230 such as RAM, an operation interface 260 including buttons and a touch panel, through which the user's operation may be entered, a display 270 such as a liquid crystal display, and a communication interface 280. The communication interface 280 may include, for example, a wired and/or wireless interface, which enables communication with the terminal device 300.

The volatile memory 230 has a buffer area 231 for temporarily storing various intermediate data generated when the CPU 210 processes data. The non-volatile memory 220 may store computer programs including a computer program PG2. The computer program PG2 in the present embodiment is a controlling program to control the printer 200 and may be installed in the non-volatile memory 220 before being shipped to be delivered to the user. However, optionally, the computer program PG 2 may be provided in a form downloadable from a server or being stored in a medium such as, for example, a DVD-ROM. The CPU 210 executing the computer program PG2 may control the printing unit 100 in accordance with printable data, which may be, for example, transmitted from the terminal device 300 in the printing process described below, to print an image on a printable medium. The printer 200 in the present embodiment may use a piece of fabric as the printable medium and may print an image on, for example, a garment S (see FIG. 2) such as a T-shirt.

The printing unit 100 may be an inkjet-printing apparatus, which prints an image by discharging droplets of inks in multiple colors such as cyan (C), magenta (M), yellow (Y), and black (K). The printing unit 100 includes a printing head 110, a head driving assembly 120, a main-scanning assembly 130, and a conveyer 140.

Figure 2:
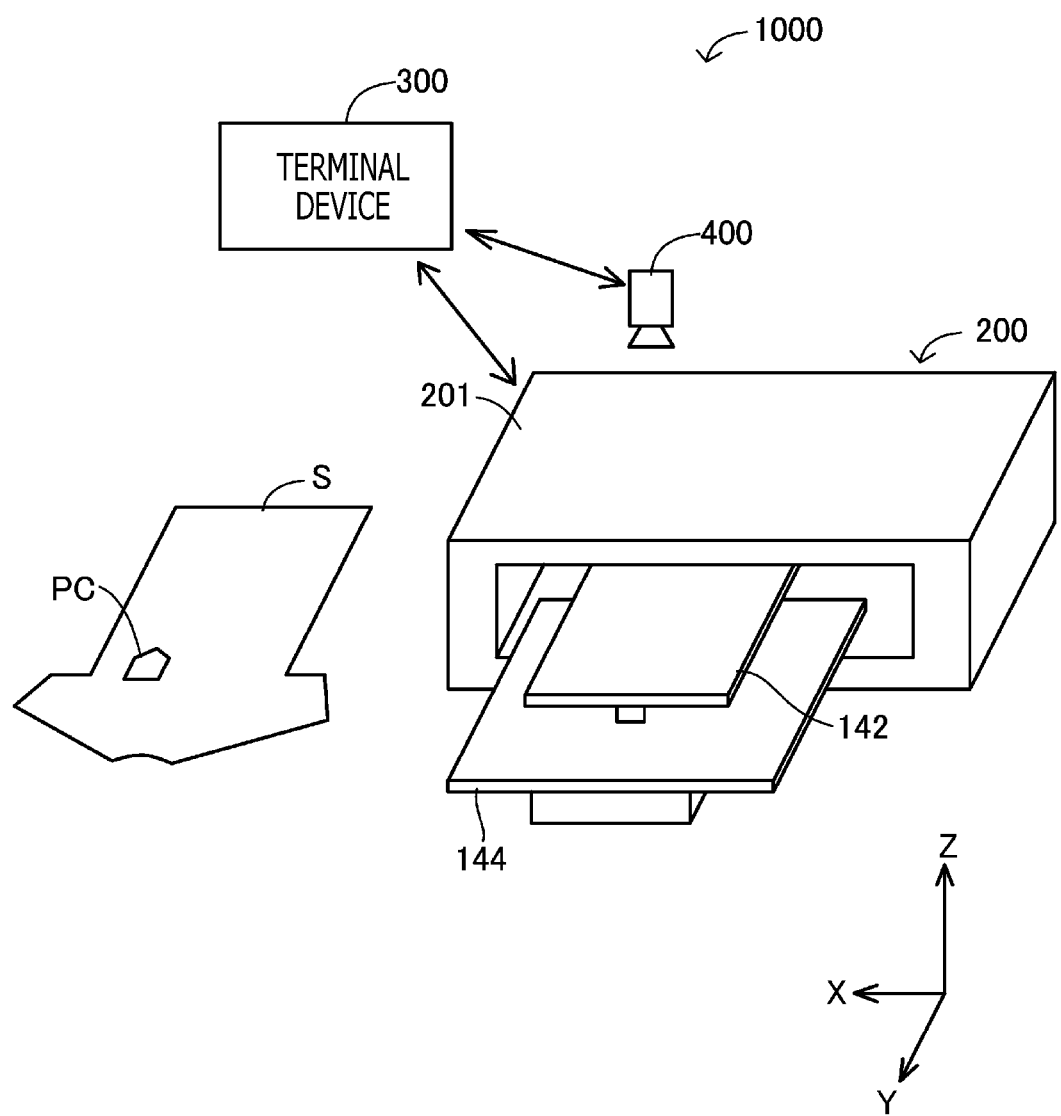
FIG. 2 is an overall illustrative view of the printing system 1000 according to the embodiment of the present disclosure.

The printing system 1000 will be described further with reference to FIG. 2. FIG. 2 is an overall illustrative view of the printing system 1000 according to the embodiment of the present disclosure. A leftward direction, a rightward direction, a frontward direction, a rearward direction, an upward direction, and a downward direction of the printer 200 may be called as +X-direction, −X-direction, +Y-direction, −Y-direction, +Z-direction, and −Z-direction, respectively, as indicated by three-dimensioned arrows in FIG. 2.

The main-scanning assembly 130 may move a carriage (not shown), on which the printing head 110 is mounted, to reciprocate inside the housing 201 in a main-scanning direction, e.g., the X-direction in FIG. 2, by use of a main-scanning motor (not shown). Thereby, a main-scanning operation, in which the printing head 110 reciprocates along the main-scanning direction, i.e., the X-direction, over the printable medium such as the garment S, may be performed.

The conveyer 140 includes a platen 142 and a tray 144, which are arranged in a central area in the X-direction in the housing 201. The platen 142 is in a form of a plate and has an upper surface, which is a surface in the +Z-direction, may serve as a loadable surface, on which the printable medium such as the garment S may be placed. The platen 142 is fixed to the tray 144, which has a form of a plate and is located on a side in the −Z-direction with respect to the platen 142. The tray 144 is substantially larger than the platen 142. The printable medium such as the garment S may be retained by the platen 142 and the tray 144. The platen 142 and the tray 144 may be conveyed in a conveying direction, e.g., the Y-direction in FIG. 2, which intersects with the main-scanning direction, by a driving force from a sub-scanning motor (not shown). Thereby, a sub-scanning operation, in which the printable medium such as the garment S may be conveyed in the conveying direction with respect to the printing head 110, may be performed.

The head driving assembly 120 (see FIG. 1) may, while the main-scanning assembly 130 performs the main-scanning operation, supply driving signals to the printing head 110 to drive the printing head 110. The printing head 110 includes a plurality of nozzles (not shown) and may discharge the ink droplets in accordance with the driving signals at the printable medium, which is being conveyed in the conveying direction by the conveyer 140, to form dots on the printable medium.

The image-capturing device 400 as shown in FIG. 2 is supported by a supporting tool (not shown) and is arranged on a side of the printer 200 in the +Z-direction. The image-capturing device 400 may be located at a position apart from the printer 200 and is arranged to face the upper surface of the platen 142 to capture an image of the printable medium such as the garment S placed on the upper surface of the platen 142. Thereby, the image-capturing device 400 may generate the captured-image data composing the image of the printable medium such as the garment S.

A-2. Actions in Printing System 1000

Actions performable in the printing system 1000 will be described below. The printing system 1000 may print a predetermined image, e.g., pattern, logo, etc., in a printable area being a part of the printable medium, e.g., the garment S. The garment S in the present embodiment is, as shown in FIG. 2, a T-shirt, and the printable area is an area including a chest pocket PC arranged on the T-shirt. The garment S may be, for example, placed on the platen 142 by a worker. However, it may be difficult for the worker to place the garment S on the platen 142 to locate the chest pocket PC at an exact same position on the platen 142 each time as the worker handles a plurality of garments S one after another. In this regard, the printing system 1000 provides a function to specify an area, which contains the chest pocket PC of the garment S placed on the platen 142 as the printable area, and to print the image on the specified printable area.

A-2-1. Template Registration Process

A template registration process is a process to generate template image data to be used in the printing process for specifying the printable area, in which the chest pocket PC is located, with use of a sample garment S. The printing process will be described further below. The sample garment S may be, for example, one of a plurality of garments S for the workers to print the image thereon.

Figure 3A:
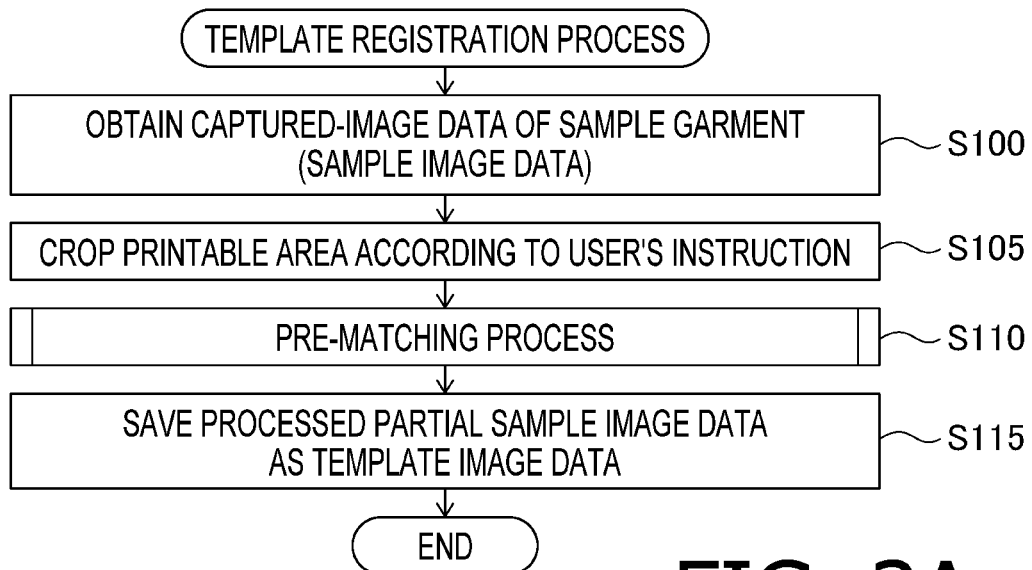
FIG. 3A is a flowchart to illustrate a flow of steps in a template registration process to be conducted in the printing system 1000 according to the embodiment of the present disclosure.

FIG. 3A is a flowchart to illustrate a flow of steps in the template registration process to be conducted in the printing system 1000. The template registration process may start, for example, while the sample garment S is set on the platen 142 and the image-capturing device 400 is ready to capture an image of the garment S on the platen 142 from above, and when the user inputs a start command in the terminal device 300. The template registration process may be conducted by the CPU 310 of the terminal device 300.

In S100, the CPU 310 obtains captured-image data of the sample garment S from the image-capturing device 400. In particular, the CPU 310 may transmit an image-capturing command to the image-capturing device 400. The image-capturing device 400 may capture the image of the sample garment S set on the platen 142, generate captured-image data composing the captured image, and transmit the generated captured-image data to the terminal device 300. The captured-image data may be, for example, a unit of image data including RGB values, each of which corresponds to one of a plurality of pixels and indicates a color of the pixel, composing the captured image. The RGB value is a value of a color in an RGB-color system containing three component values of R, G, and B. The captured-image data composing the image of the sample garment S obtained in S100 may be hereinafter called as sample image data, and the image composed of the sample image data may be called as a sample image.

FIGS. 4A-4F illustrate images to be used in the printing system 1000 according to the embodiment of the present disclosure. As shown in FIGS. 4A-4F, a left-right direction of each image corresponds to the main-scanning direction of the printer 200 (i.e., the X direction in FIG. 2), and an up-down direction of the image corresponds to the conveying direction of the printer 200 (i.e., the Y direction in FIG. 2). FIG. 4A shows an example of a sample image It as composed of the sample image data. The sample image It includes an image representing the sample garment S placed on the platen 142. In the following paragraphs, the image representing the sample garment S included in the sample image It may be called as "garment St," and an image indicating the chest pocket PC may be called as "chest pocket PCt."

In S105, the CPU 310 crops a printable area PAt from the sample image It based on an instruction by the user. For example, the CPU 310 may display a user interface (UI) screen (not shown) through the display 370. The user may enter an instruction to designate the printable area PAt in the sample image It on the UI screen through a pointing device such as a mouse. The example in FIG. 4A shows the printable area PAt containing the chest pocket PC of the garment St. The CPU 310 conducts a cropping process to the sample image data and generates partial sample image data corresponding to the printable area PAt. FIG. 4B illustrates a partial sample image PIt as composed of the partial sample image data.

In S110, the CPU 310 conducts a pre-matching process to the partial sample image data to generate processed partial sample image data. The pre-matching process is a process to extract edges of an object e.g., the chest pocket PCt, in an image, in preparation for a matching process. The pre-matching process and the matching process will be described further below. The processed partial sample image data is binary image data indicating each pixel in the partial sample image data is either an edge pixel or a non-edge pixel.

In S115, the CPU 310 saves the processed partial sample image data in the non-volatile memory 220 as template image data. FIG. 4C shows an example of a template image TI as composed of the template image data. The template image TI includes edges Egt forming contours of an object, which is included in the partial sample image PIt. In the example of FIG. 4C, the template image TI includes edges Egt forming contours of the chest pocket PCt.

A-2-2. Printing Process

Figure 3B:
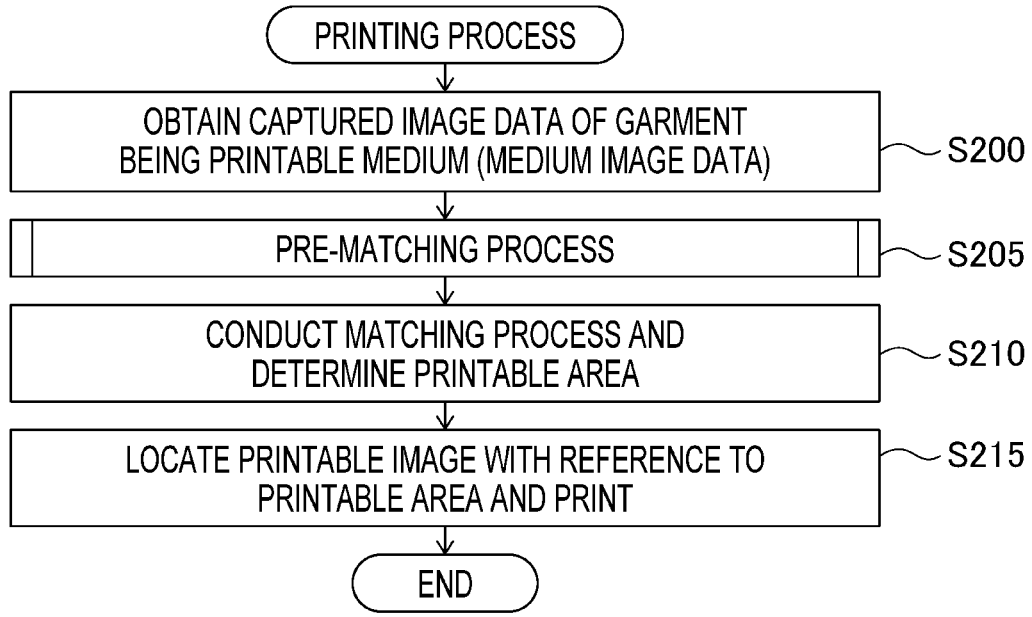
FIG. 3B is a flowchart to illustrate a flow of steps in a printing process to be conducted in the printing system 1000 according to the embodiment of the present disclosure.

The printing process is a process, in which a predetermined image, e.g., pattern, logo, etc., is printed in the printable area being a part of the garment S as the printable medium. FIG. 3B is a flowchart to illustrate a flow of steps in the printing process. The printing process may start, while the garment S as the printable medium is set on the platen 42 and the image-capturing device 400 is ready to capture an image of the garment S on the platen 142 from above, when the user inputs a start command in the terminal device 300. The printing process may be conducted by the CPU 310 of the terminal device 300.

In S200, the CPU 310 obtains captured-image data of the garment S as the printable medium from the image-capturing device 400. The captured-image data may be obtained in the same manner as the captured-image data of the sample garment S obtained in S100 in FIG. 3A. In the following paragraphs, the captured-image data composing the image of the garment S as the printable medium obtained in S200 may be called as medium image data, and the image composed of the medium image data may be called as a medium image.

FIG. 4D shows an example of a medium image Is as composed of the medium image data. The medium image Is includes an image representing the garment S set on the platen 142, similarly to the sample image It. In the following paragraphs, the image representing the sample garment S included in the medium image Is may be called as "garment Ss," and the image representing the chest pocket Pc in the garment Ss may be called as "chest pocket PCs."

In S205, the CPU 310 conducts a pre-matching process to the obtained medium image data to generate processed medium image data. The processed medium image data is binary image data indicating each pixel in the medium image data is either an edge pixel or a non-edge pixel. The pre-matching process is the same as the pre-matching process in S100 (see FIG. 3A); therefore, detailed explanation of the process in S205 is herein omitted. FIG. 4E shows processed medium image SI as composed of the processed medium image data. The processed medium image SI includes edges Egs of an object in the medium image Is. In the example of FIG. 4E, the processed medium image SI includes edges Egs forming contours of the garment Ss and the chest pocket PCs.

In S210, the CPU 310 conducts the matching process and specifies a printable area PAs in the processed medium image SI. The matching process may be conducted with use of the processed medium image data and the template image data, i.e., the processed partial sample image data. The matching process is a process, in which positional relation between the processed medium image SI and the template image TI is determined. The matching process may be conducted, for example, with use of a known pattern-matching algorithm. For example, the pattern matching may be a method to search for most-matched positional relation between the processed medium image SI and the template image TI, in which a degree of similarity between the processed medium image SI and the template image TI is highest, by changing the positional relation (coordinates and angles) between the processed medium image SI and the template image TI by a predetermined increment, and in an area where the processed medium image SI and the template image TI overlap, by calculating the degree of similarity between the processed medium image SI and the template image TI. The degree of similarity between the processed medium image SI and the template image TI may be determined, for example, based on a number of edge pixels in the processed medium image SI that overlap the edge pixels the template image TI.

The positional relation between the processed medium image SI and the template image TI may be indicated by, for example, a position (coordinates) of the template image TI with respect to the processed medium image SI and inclination (angle) of the template image TI with respect to processed medium image SI. The positional relation may further include largeness (scale) of the template image TI with respect to the processed medium image SI. In FIG. 4E, a rectangle drawn in a broken line represents an area of the template image TI arranged over the processed medium image SI according to the positional relation specified in the matching process. The CPU 310 specifies the printable area PAs based on the specified positional relation. For example, the area of the template image TI arranged over the processed medium image SI according to the specified positional relation may be specified as the printable area PAs (FIG. 4E). The processed medium image SI and the medium image Is are in correspondence with each other; therefore, specifying the printable area PAs in the processed medium image SI equates to specifying the printable area PAs in the medium image Is.

In S210, the CPU determines a position of the printable image, e.g., pattern, logo, etc., with respect to the specified printable area PAs and prints the image therein. For example, the CPU 310 may generate printable data, which may cause the printable image to be printed in an area, corresponding to the printable area PAs specified in the processed medium image SI, e.g., an area of the chest pocket PC, on the garment S and transmit the generated printable data to the printer 200. The printer 200 may control the printing unit 100 in accordance with the received printable data to print the image on the garment S.

A-2-3. Pre-Matching Process

The pre-matching process in S110 in FIG. 3A and S205 in FIG. 3B will be described below. In the pre-matching process in S110 in FIG. 3A, the partial sample image data is processed as the subject image data. In the pre-matching process in S205 in FIG. 3B, the medium image data is processed as the subject image data. In the following paragraphs, the pre-matching process to process the medium image data as the subject image data will be described.

Figure 5:
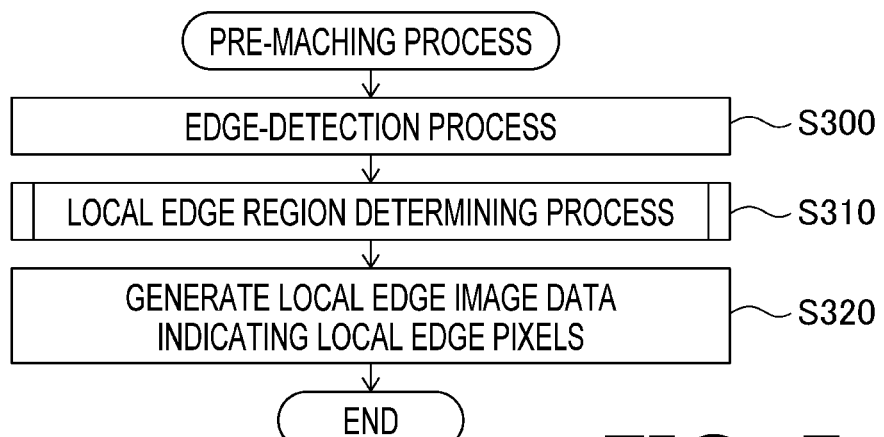
FIG. 5 is a flowchart to illustrate a flow of steps in a pre-matching process to be conducted in the printing system 1000 according to the embodiment of the present disclosure.

FIG. 5 is a flowchart to illustrate a flow of steps in the pre-matching process. In S300, the CPU 310 conducts an edge-detection process to the subject image data. The edge-detection process is a process to detect edge pixels in a plurality of pixels forming the subject image composed of the subject image data and generate edge image data describing the detected result. The edge image data is a binary image data indicating each pixel is either an edge pixel or a non-edge pixel. In this context, the edge image data generated in S300 may be called as plain edge image data to distinguish it from local edge image data, which will be described further below.

The edge pixels may be detected by various methods. The present embodiment uses the Canny Edge method, which may be preferable for detecting edge pixels that form contours of objects in an image. Optionally, for another example, a Laplacian filter or a Sobel filter may be used to calculate edge intensity, and pixels, of which edge intensity is greater than a threshold TH1, may be detected as edge pixels.

FIGS. 6A-6C are illustrative views of images to be used in the pre-matching process. FIG. 6A shows an example of a plain edge image EI as composed of the plain edge image data. A region enclosed by a broken line in the plain edge image EI indicates a pocket-existing region AA, which includes the chest pocket PCs of the garment Ss shown in FIG. 4D. The plain edge image EI includes not only edge pixels forming edges of the contours of the garment Ss and the chest pocket PCs but also edge pixels that are dispersed entirely over the garment Ss. The dispersed edge pixels may be edge pixels forming edges of, for example, minute formation such as fabric grain of the garment Ss. In the following paragraphs, an edge forming a feature of the object, such as an edge of the contours of the garment Ss or the chest pocket PCs, which exists locally in the image, may be called as a local edge, and edge pixels forming the local edge may be called as local edge pixels. Meanwhile, edges that are dispersed in the image, e.g., the edges of minute formation such as fabric grain of the garment Ss, may be called as dispersed edges, and edge pixels forming the dispersed edges may be called as dispersed edge pixels. In order to specify an object, e.g., the chest pocket PCs, which locally exists in the image through the matching process such as pattern matching, it may be preferable that only the local edge pixels are detected while the dispersed edge pixels are restrained from being detected. If, for example, the matching process is conducted with use of the plain edge image data, the dispersed edges may act as noise, and it may be difficult to conduct matching preferably accurately.

In S310, the CPU 310 conducts a local edge region determining process with use of the subject image data. The local edge region determining process a process, in which the CPU 310 determines whether each one of a plurality of smaller regions arranged in the subject image (e.g., the partial sample image PIt and the medium image Is), is a local edge region and generates local edge region data indicating the determined result. In this context, the local edge region is a region, in which the local edge pixels are more likely to exist than a non-local edge region.

Figure 7:
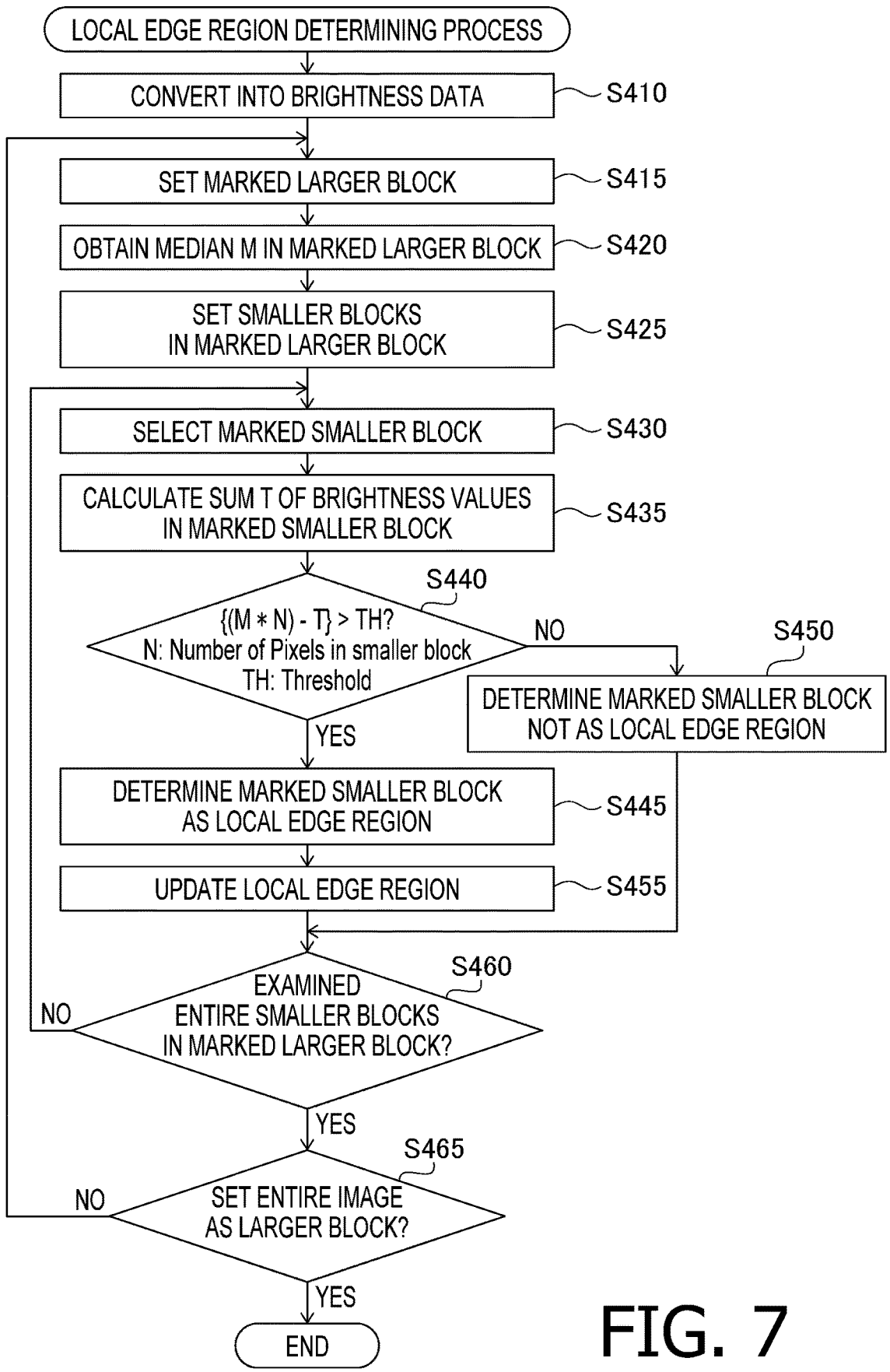
FIG. 7 is a flowchart to illustrate a flow of steps in a local edge region determining process to be conducted in the printing system 1000 according to the embodiment of the present disclosure.

FIG. 7 is a flowchart to illustrate a flow of steps in the local edge region determining process. In S410, the CPU 310 converts a format of the subject image data from the RGB-data format to a brightness-data format. In particular, the CPU 310 converts the RGB value in each of the pixels in the subject image data being RGB-image data, to a brightness value. The brightness value may be, for example, a value in 256 scale between 0 and 255. A known formula to convert the RGB values to the brightness values may be used.

Figure 8A:
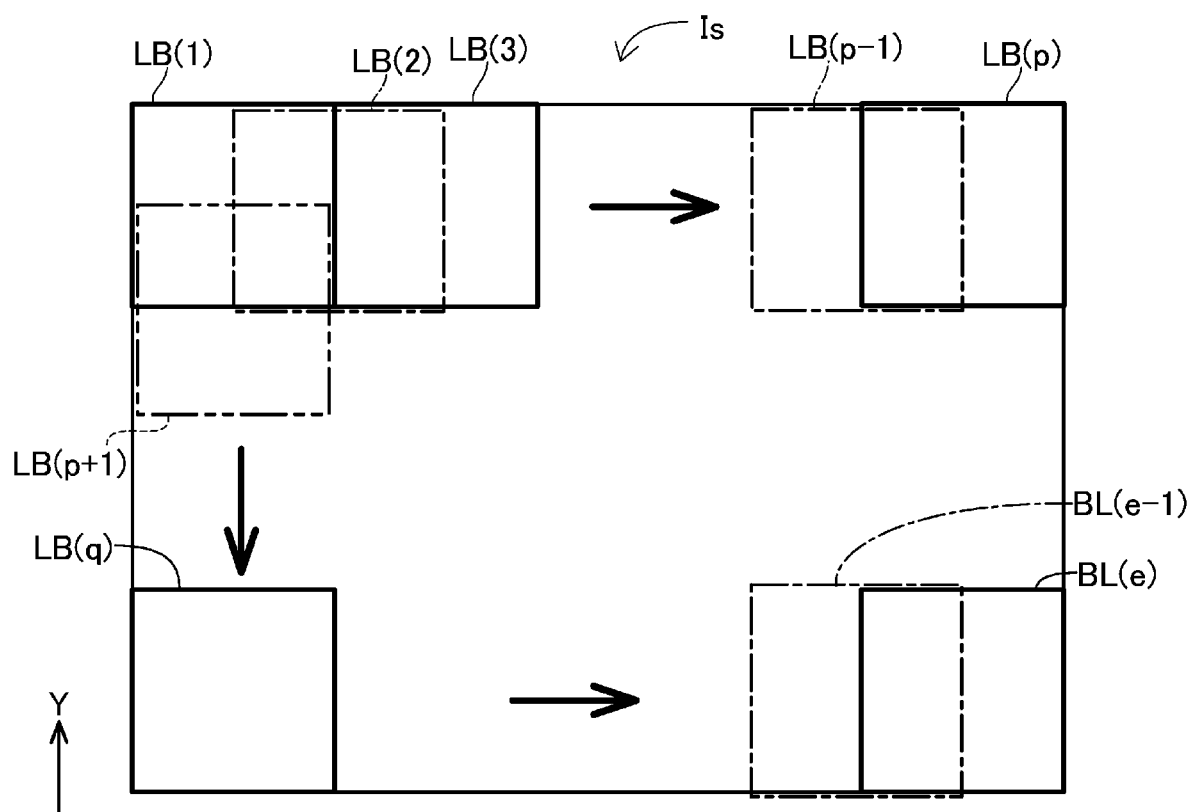
FIGS. 8A-8B are illustrative views of blocks arranged on a subject image according to the embodiment of the present disclosure.
Figure 8B:
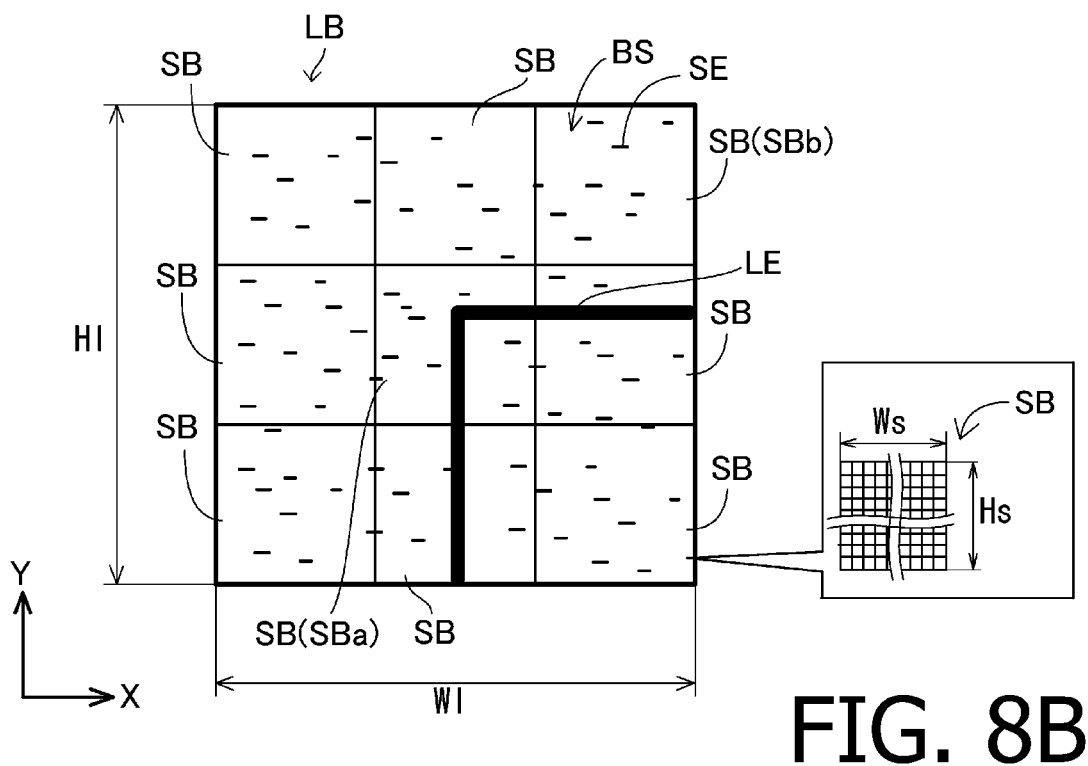

In S415, the CPU 310 sets one of larger blocks arranged in the subject image, e.g., the medium image IS, as a marked larger block. FIGS. 8A-8B are illustrative views of blocks arranged in the subject image. FIG. 8A illustrates the medium image Is being the subject image, in which larger blocks LB are arranged. A number in parentheses in the reference sign drawn from each larger block LB is a number identifying the connected larger block LB. FIG. 8B shows one of the larger blocks LB. A number of pixels W1 in the single larger block LB in the X-direction and a number of pixels H1 in the single larger block LB in the Y-direction may be, for example, in a range between 36 and 180. A shape of the larger block LB is a rectangle, and in the present embodiment, a square (W1=H1).

A first marked larger block in the present embodiment is a larger block LB(1) at an upper-left corner in FIG. 8A. The single larger block LB is a rectangular region containing K pixels, whereas K is an integer greater than or equal to 2. The CPU 310 processes the first marked larger block LB(1) in FIG. 8A through S420-S460 and next sets a larger block LB(2) in FIG. 8A as a second marked larger block. The larger block LB(2) is shifted from the larger block LB(1) in the +X-direction by a distance of (W1/2) pixel. Therefore, a +X-side half of the larger block LB(1) overlaps a −X-side half of the larger block LB(2). In this way, the CPU 310 sets a marked larger block one after another in a row, shifting in the +X-direction by the distance of (W1/2) pixel, until a larger block at the end of the row in the medium image Is being the subject image in the +X-direction is set as the marked larger block. In the example of FIG. 8A, the larger blocks LB(1), LB(2), LB(3) . . . , LB(p−1), and LB(p) in the first row are set as the marked larger pixel sequentially. In this arrangement, an end of the first larger block LB(1) on the +X-side and an end of the third larger block LB(3) on the −X-side adjoin.

Next to the larger block LB(p) at the end of the first row in the +X-direction, a first larger block LB(p+1) in a second row is set as the marked larger block. The larger block LB(p+1) is shifted from the first larger block LB(1) in the first row in the −Y-direction by a distance of (H1/2) pixel. Therefore, a −Y-side half of the larger block LB(1) overlaps a +Y-side half of the larger block LB(p+1). The larger blocks LB in the second row are set as the marked larger pixel one after another, shifting in the +X-direction by the distance of (W1/2) pixel, similarly to the larger blocks LB in the first row.

The CPU 310 shifts the row to set the marked larger block one after another in the −Y-direction by the distance of (H1/2) pixel, until the row at the end in the medium image Is being the subject image in the −Y-direction is set. In the example of FIG. 8A, a first larger block LB(q) in the final row at the end of the medium image Is in the −Y-direction, a larger block LB(e−1) second to the end of the larger blocks in the final row, and the final larger block (e) in the final row are shown.

In S420, the CPU 310 obtains a median value M among the brightness values of the K pixels in the marked larger block LB as a feature value of the marked larger block. For example, when K is an even number, and when the brightness values in the K pixels are arranged in an increasing order, the median value M is an average of the (K/2)th brightness value and the {(K/2)+1}th brightness value. Or, when K is an odd number, and when the brightness values in the K pixels are arranged in an increasing order, the median value M is the {(K+1)/2}th brightness value.

In S425, the CPU 310 sets a plurality of smaller blocks SB in the marked larger block. FIG. 8B shows nine (9) smaller blocks SB set in a larger block LB. As shown in FIG. 8B, in the present embodiment, by dividing the marked larger block, e.g., the larger block LB in FIG. 8B, into nine regions, nine smaller blocks SB in a matrix of 3-by-3 are arranged in the single marked larger block. Therefore, in the present embodiment, a number of pixels Ws in a single smaller block SB in the X-direction is ⅓ of the number of pixels W1 in the single larger block LB in the X-direction, and a number of pixels Hs in the single smaller block SB in the Y-direction is ⅓ of the number of pixels H1 in the single larger block LB in the Y-direction. A number of pixels N in the single smaller block SB is (Ws×Hs).

In S430, the CPU 310 selects one of the plurality of, e.g., nine, smaller blocks SB set in the marked larger block as a marked smaller block.

In S435, the CPU 310 calculates a sum T of the brightness values of the K pixels in the marked smaller block. In S440, the CPU 310 determines whether a difference {(M*N)−T} between a value (M*N), which is the median value M of the marked larger block multiplied by the number of pixels N in the marked smaller block, and the sum T of the brightness values in the marked smaller block is greater than a predetermined threshold TH. The determination in S435 equates to determining whether a difference {M−(T/N)} between the median value M of the marked larger block and the average value (T/N) of the brightness values in the marked smaller block is greater than a threshold (THIN).

If the difference {(M*N)−T} is greater than the threshold TH (S440: YES), in S445, the CPU 310 determines that the marked smaller block is a local edge region. In S455, the CPU 310 updates the local edge region data. FIGS. 9A-9B are illustrative views of the local edge region data. FIG. 9A illustrates a part of the medium image Is. FIG. 9B illustrates a part of a local edge region image AI as composed of the local edge region data. The part of the local edge region image AI shown in FIG. 9B is the part of the medium image Is shown in FIG. 9A.

The plurality of larger blocks LB set in the medium image Is are, as described above, arranged to be shifted from one another in the X-direction and the Y-direction by the distance of a half of the number of the pixels in the X-direction and the Y-direction. Therefore, the smaller blocks SB in each larger block LB may partly overlap some of the smaller blocks SB in another larger clock LB. For example, the smaller blocks SB in the larger block LB in an odd-numbered column partly overlap some of the smaller blocks in the larger block LB in an even-numbered column aligning next thereto in the X-direction. The smaller blocks SB in the larger block LB in an odd-numbered row partly overlap some of the smaller blocks in the larger block LB in an even-numbered row aligning next thereto in the Y-direction. In the example of FIG. 9A, a +X-side half of the smaller block SB1*b* in the larger block LB(1) overlaps a −X-side half of the smaller block SB2*a*, which is the smaller block with hatching, in the larger block LB(2). A −X-side half of the smaller block SB1*c* in the larger block LB(1) overlaps a +X-side half of the smaller block SB2*a* in the larger block LB(2). In this arrangement, an end of the smaller block SB1*b* on the +X-side and an end of the smaller block SB1*c* on the −X-side extend through a center of the smaller block SB2*a* in the X-direction.

The local edge region image AI includes a plurality of pixels P, each of which corresponds to one of the smaller blocks SB in the medium image Is arranged without overlapping one another and without being spaced apart from one another. In the present embodiment, the local edge region image AI includes a plurality of pixels P arranged in matrix, each of which corresponds to one of the smaller blocks SB in the larger blocks LB in the odd-numbered columns and the odd-numbered rows. The local edge region image AI does not include pixels corresponding to any of the smaller blocks SB in the larger blocks LB in the even-numbered columns or the even-numbered rows. For example, each of 18 pixels P in the local edge region image AI in FIG. 9B corresponds to one of 18 smaller blocks SB, which are drawn in solid lines, in the larger blocks LB(1), LB(3). For example, the pixels P1*a*, P1*b*, Plc, P3*a*, P3*b*, and P3*c* in FIG. 9B correspond to the smaller blocks SB1*a*, SB1*b*, SB1*c*, SB3*a*, SB3*b*, and SB3*c* in FIG. 9A, respectively.

The local edge region data is binary image data indicating whether each of the smaller blocks SB corresponding to one of the pixels therein is a local edge region or non-local edge region. An initial value in each pixel included in the local edge region image AI is a value indicating that the smaller block SB is a non-local edge region, e.g., zero (0).

In S455, if the local edge region image AI has a pixel P corresponding to the marked smaller block, the CPU 310 sets a value, e.g., one (1), being indication of a local edge region, to the pixel P in the local edge region image AI corresponding to the marked smaller block. If the local edge region image AI does not have a pixel P corresponding to the marked smaller block, the CPU 310 sets the value being indication of a local edge region to the pixel in the local edge region image AI corresponding to a smaller block overlapping the marked smaller block.

If the difference {(M*N)−T} is smaller than or equal to the threshold TH (S440: NO), in S450, the CPU 310 determines that the marked smaller block is not a local edge region. In other words, the CPU 310 determines that the marked smaller block is a non-local edge region. The CPU 310 skips S455. Therefore, the local edge region data is not updated.

As may be understood from the above description, when at least one of the smaller blocks SB, among a specific smaller block SB corresponding to a specific pixel P in the local edge region image AI and all of the smaller blocks SB that overlap the specific smaller block SB, is determined as the local edge region in S445, the specific smaller block SB is determined conclusively as the local edge region.

In S460, the CPU 310 determines whether all of the smaller blocks SB in the marked larger block LB have been examined. If one or more unexamined smaller block SB remains in the marked larger block LB (S460: NO), the CPU 310 returns to S430 and selects one of the unexamined smaller block SB as a new marked smaller block SB. If all of the smaller blocks SB in the marked larger block LB have been examined (S460: YES), the CPU 310 proceeds to S465.

In S465, the CPU 310 determines whether all of the larger blocks LB in the subject image, e.g., the medium image Is, have been examined as the marked larger block. For example, in the medium image Is shown in FIG. 8A, after the final larger block LB(e) in the final row is processed as the marked larger block, the CPU 310 may determine that the larger blocks LB in all of the subject image have been examined as the marked larger block. If one or more unexamined larger block LB remains in the subject image (S465: NO), the CPU 310 returns to S415 and selects one of the unexamined larger blocks LB as a new marked larger block. If all of the larger blocks LB in the subject image have been examined (S465: YES), the CPU 310 terminates the local edge region determining process.

At the time when the local edge region determining process is terminated, the conclusive local edge region data is completed. FIG. 6B shows the local edge region image AI corresponding to the plain edge image EI shown in FIG. 6A. In the local edge region image AI in FIG. 6B, parts where local edge regions Ea are located are indicated in black. FIG. 6B shows that parts, in which the contours of the garment Ss and the chest pocket PCs are located, may more likely be determined as the local edge regions Ea, while parts, in which minute forms alone such as the fabric grains in the garment Ss are located, may less likely be determined as the local edge region Ea.

After terminating the local edge region determining process, in S320 in FIG. 5, the CPU 310 generates local edge image data, which composes local edge image LEI. The local edge image LEI is binary image data indicating whether each pixel is either a local edge pixel or a pixel different from the local edge pixel (non-local edge pixel). The local edge pixel is an edge pixel, which is specified in the plain edge image EI and is located in the local edge region. FIG. 6C shows the local edge image LEI corresponding to the plain edge image EI in FIG. 6A and to the local edge region image AI in FIG. 6B. For example, the local edge pixels LEp in the local edge image LEI shown in FIG. 6C are pixels located in the local edge regions Ea specified in the local edge region image AI shown in FIG. 6B among the edge pixels Ep specified in the plain edge image EI shown in FIG. 6A. In the local edge image LEI in FIG. 6C, the pixels forming the contours of the garment Ss and the chest pocket PCs are specified as the local edge pixels LEp in higher probability, while not may pixels forming the minute forms of the fabric grains in the garment Ss are specified as the local edge pixels LEp. In other word, in the local edge image data, the pixels forming local edges such as contours of an object may be specified, distinctly from the pixels forming edges that are dispersed throughout the image, more accurately compared to the plain edge image data.

The local edge image data, which is generated through the matching process (see FIG. 5) with use of the medium image data as the subject image data, is the processed medium image data (S205 in FIG. 3B, FIG. 4E). The local edge image data, which is generated through the matching process (see FIG. 5) with use of the partial sample image data as the subject image data, is the template image data (S110 in FIG. 3A, FIG. 4C).

According to the embodiment described above, the CPU 310 may set a plurality of larger blocks LB in the subject image, e.g., the medium image Is, and a plurality of smaller blocks SB smaller than the larger blocks LB (S415 in FIG. 7, S425 in FIG. 8). The CPU 310 may calculate the sum T of the brightness values in each smaller block SB and the median value M in each larger block LB (S420 and S435 in FIG. 7). The CPU 310 may determine whether each smaller block SB is a local edge region based on the comparison between the sum T of the brightness values in the smaller block SB and the median value M of the larger block LB containing the smaller block SB (S440-S450 in FIG. 7). The CPU 310 may generate the local edge image data indicating the local edge pixels in the subject image with use of the determined results indicating that the smaller blocks SB are the local edge regions (S455 in FIG. 7 and S320 in FIG. 5).

The median value M indicating the feature amount of the larger block LB may likely to reflect overall features of the subject image, and the sum T of the brightness values indicating the feature amount of the smaller block SB may likely to reflect local features of the subject image. According to the embodiment described above, whether the smaller block SB is a local edge region is not is determined based on the comparison between the sum T of the brightness values in the smaller block SB and the median value M of the larger block LB that contains the smaller block SB. Therefore, the edges of the object in the subject image may be specified accurately. For example, the smaller block SB containing local edges that are different from edges dispersed throughout the subject image may be specified as the local edge region Ea accurately. In particular, the smaller blocks SB containing edges of an object that is located locally in an image, e.g., the edges of the contours of the chest pocket PCs in the garment Ss (see FIG. 4D), may be specified distinctly from the regions that contains the dispersed edge, e.g., the edges forming the fabric grains in the garment Ss, alone.

For example, in the pocket-existing region AA in the local edge region image AI shown in FIG. 6B, the smaller blocks SB containing the edges forming the contours of the chest pocket PCs are specified as the local edge regions in a relatively high rate of probability. Meanwhile, the smaller blocks SB containing the edges forming the fabric grains in the garment Ss may be excluded from the local edge regions Ea in a relatively high rate of probability. Therefore, in the conclusively generated local edge image LEI as shown in FIG. 6C, compared to the plain edge image EI shown in FIG. 6A, the edges forming the fabric grains in the garment Ss are excluded from the local edge pixels LEp in a relatively high probability while the edges forming the contours of the chest pocket PCs and the garment Ss are maintained as the local edge pixels LEp in a relatively high probability.

Moreover, according to the embodiment described above, the subject image data in the pre-matching process includes the medium image data, which composes the medium image Is. In other words, the CPU 310 may generate the processed medium image data being the local edge image data by conducting the pre-matching process to the medium image data being the subject image data (S205 in FIG. 3B). Further, by conducting the pattern matching with use of the processed medium image data, the CPU 310 may specify the chest pocket PCs being the object in the medium image Is (S210 in FIG. 3B). As a result, the CPU 310 may conduct the pattern matching with use of the processed medium image data, in which the edges forming the contours of the chest pocket PCs in the medium image Is are accurately specified, the chest pocket PCs in the medium image Is may be specified accurately.

Meanwhile, as shown in the local edge image LEI in FIG. 6C, every edge pixel forming the contours of the chest pocket PCs may not necessarily be specified, or every edge forming the fabric grains may not necessarily be excluded. However, when the CPU 310 conducts the matching process in S210 (see FIG. 3B) with use of the processed medium image data being the local edge image data, the edge pixels forming the contours of the chest pocket PCs may be specified in the substantial accuracy, in which matching in substantial accuracy is achievable.

Moreover, according to the embodiment described above, a number of the edge pixels to be used in the pattern matching may be reduced; therefore, the pattern matching may be performed more speedily.

Moreover, according to the embodiment described above, the subject image data in the pre-matching process includes the partial sample image data, which composes the partial sample image PIt. In other words, by conducting the pre-matching process to the partial sample image data, the CPU 310 may generate the template image data being the local edge image data (S115 in FIG. 3A). Further, by conducting the pattern matching to the template image data, the CPU 310 may specify the chest pocket PCs being the object in the medium image Is (S210 in FIG. 3B). As a result, in the template image TI (see FIG. 4C), the edges forming the contours of the chest pocket PCs may be maintained while the edges forming the fabric grains in the garment Ss may be excluded. Therefore, though the pattern matching, the chest pocket PCs in the medium image Is may be specified even more accurately.

As described above, the sum T of the brightness values expressing the feature amount of the smaller block SB divided by the number of pixels N in the smaller block SB provides the average value (T/N) in the smaller block SB. Therefore, the sum T of the brightness values is regarded as a value related to the average value of the pixels in the smaller block SB. Meanwhile, the feature amount in the larger block LB is the median value M. Thus, in the embodiment described above, the feature amount of the smaller block SB is a value related to the average value, and the feature amount of the larger block LB is a value related to the median value M. As a result, with use of the substantially adequate feature amounts, the edges of the object in the image may be specified in even higher accuracy.

More detailed explanation concerning the value related to the average value of the smaller block SB and the median value M of the larger block LB is given below. As shown in FIG. 8B, the larger block LB includes base-color parts, which includes dispersed edges such as the minute edges of the fabric grains, and edges LE of the contours of a local object such as the chest pocket PCs. In this arrangement, the larger block LB includes a smaller block SBa, which includes the base-color part BS and the edges LE of the contours, and a smaller block SBb, which includes the base-color part BS but does not include the edges LE of the contours (see FIG. 8B).

Figure 10A:
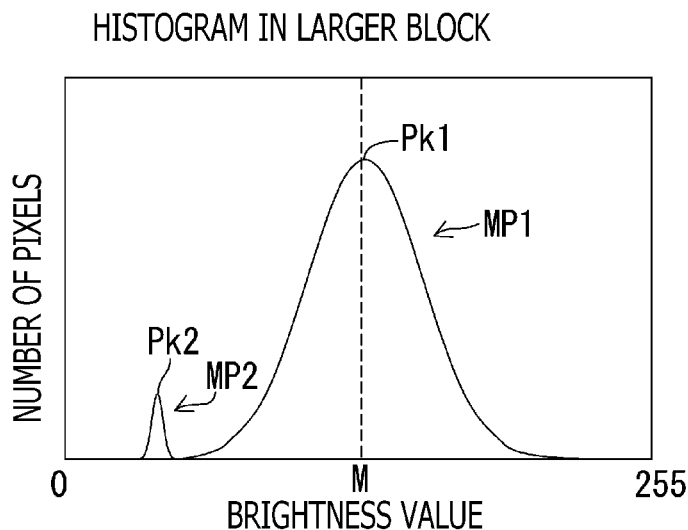
FIGS. 10A-10C are illustrative views of histograms according to the embodiment of the present disclosure.
Figure 10B:
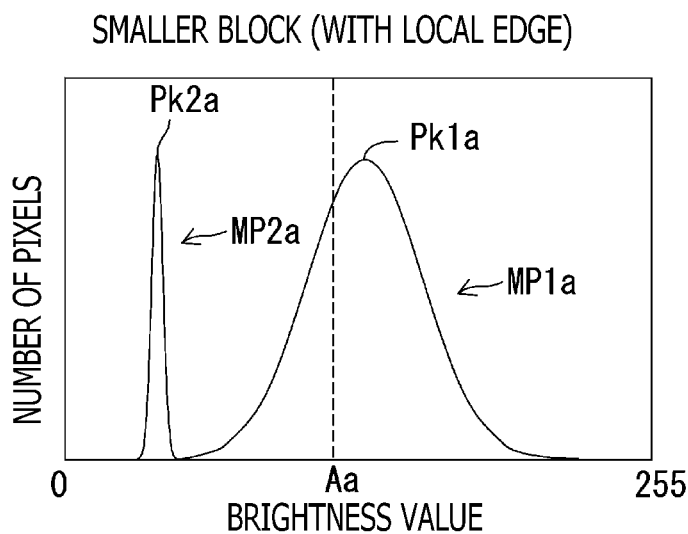
Figure 10C:
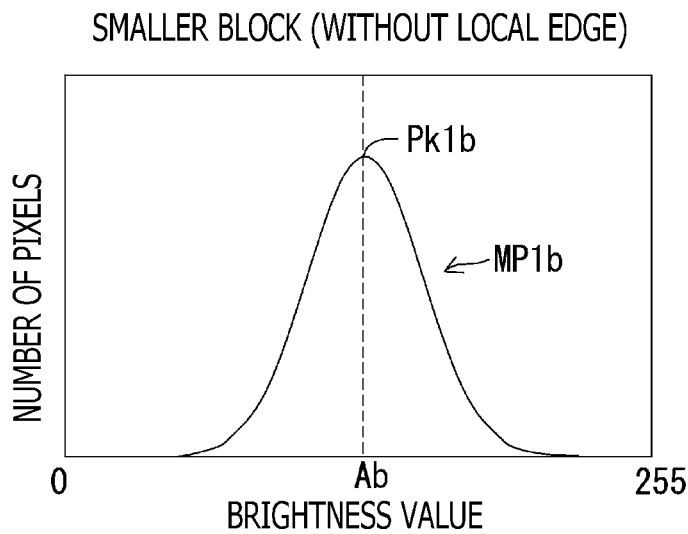

FIGS. 10A-10C are illustrative views of histograms. FIG. 10A shows a histogram of the larger block LB shown in FIG. 8B. FIG. 10B shows a histogram of the smaller block SBa shown in FIG. 8B. FIG. 10C shows a histogram of the smaller block SBb shown in FIG. 8B. The histograms shown in FIGS. 10A-10B are graphs with the horizontal axis indicating the brightness value and the vertical axis indicating a number of pixels included in each class of the brightness values.

The histogram of the larger block LB in FIG. 10A includes a first mountain portion MP1 corresponding to the base-color part BS and a second mountain portion MP2 corresponding to the edges LE of the contour. The base-color part BS is a part of the fabric in a single color; therefore, the first mountain portion MP1 corresponding to the base-color part BS may have a peak Pk1 and form to comply with normal distribution. The base-color part BS having the minute forms of, for example, the fabric grains, may have unevenness in brightness. Therefore, the first mountain portion MP1 may be in a form having a relatively large width. The edges LE of the contours are in a single color forming thin and dark shadows; therefore, the brightness values in the edges LE may be substantially lower than the base-color part BS. Therefore, the second mountain portion MP2 corresponding to the edges LE of the contours is in a form having a single peak Pk2 in compliance with the normal distribution. Meanwhile, the edges LE of the contours may form thin lines. Accordingly, a number of pixels in the edges LE is notably smaller than a number of pixels in the base-color part BS. Therefore, it may be regarded that the median value M of the larger block LB substantially matches the peak Pk1 of the first mountain portion MP1. If, for example, an average value of the larger block LB in place of the median value M is used, influence by the peak Pk2 may increase, in particular, when the peak Pk1 and the peak Pk2 are separated largely, and the average value may shift toward the peak P2 from the peak Pk1. Meanwhile, regardless of presence or absence of the edges LE of the contours, it is preferable the feature amount of the larger block LB represents the feature of the base-color part BS in the larger block LB. Therefore, it may be preferable that feature mount uses a value in proximity to the value of the peak Pk1 regardless of presence or absence of the edges LE of the contours. Accordingly, it is preferable that the feature amount of the larger block LB uses the median value M rather than the average value.

The histogram of the smaller block LBa in FIG. 10B includes a first mountain portion MP1a corresponding to the base-color part BS and a second mountain portion MP2a corresponding to the edges LE of the contour. A position of a peak PK1a of the first mountain portion MP1a and a position of a peak Pk2a of the second mountain portion MP2a in the histogram of the smaller block SBa are substantially the same as the position of the peak Pk1 of the first mountain portion MP1 and the position of the peak Pk2 of the second mountain portion MP2 in the histogram of the larger block LB shown in FIG. 10A. While the smaller block SB is smaller than the larger block LB, the smaller block SB may not include the edges LE of the contours as often as the larger block LB; however, when the smaller blocks SB does include the edges LE of the contours, an occupation rate of a number of pixels of the edges LE of the contours over a number of entire pixels in the smaller block SB may be relatively high. Therefore, a height of the peak Pk2 of the second mountain portion MP2a relative to the peak Pk1a of the first mountain portion MP1a in the histogram of the smaller block SBa is higher than a height of the peak Pk2 relative to the peak Pk1 in the histogram of the larger block LB.

The smaller block SBb includes the base-color part BS but does not include the edges LE of the contours (see FIG. 8B). Therefore, the histogram of the smaller block SBb shown in FIG. 10C includes the first mountain portion MP1b corresponding to the base-color part BS but does not include a mountain portion corresponding to the edges LE of the contours. The position of the peak Pk1b of the first mountain portion MP1b in the histogram of the smaller block SBb is substantially the same as the position of the peak Pk1 in the histogram of the larger block LB as shown in FIG. 10A.

When the smaller block SB, such as the smaller block SBa, includes the edges LE of the contours, the occupation rate of the pixels forming the edges LE of the contours over a number of entire pixels in the smaller block SB may be relatively high; therefore, there may be a substantial difference between an average value of the smaller block SB including the edges LE of the contours and an average value of the smaller block SB not including the edges LE of the contours. For example, while the smaller block SBb shown in FIG. 8B does not include the edges LE of the contours; therefore, an average value Ab of the smaller block SBb in the histogram in FIG. 10B substantially matches the peak Pk1b of the first mountain portion MP1b. In contrast, the smaller block SBa shown in FIG. 8B includes the edges LE of the contour; therefore, an average value Aa of the smaller block SBa in the histogram shown in FIG. 10B is shifted closer to the peak Pk2a from the peak Pk1a of the first mountain portion MP1a. The difference in the feature amounts may tend to appear more often when the average value is used as the feature amount than when the median value M is used as the feature amount. In particular, when the peaks Pk1a, Pk1b of the first mountain portions are separated from the peak Pk2a of the second mountain portion, it may be preferable to use the average value as the feature amount.

Meanwhile, as described above, the median value M of the larger block LB is substantially equal to the peaks Pk1, Pk1a, Pk1b of the first mountain portions MP1, MPa, MPb. Therefore, when the smaller block SB includes the edges LE of the contours, the difference between the median value M of the larger block LB and the average value of the smaller block SB tends to be larger compared to the occasion when the smaller block SB does not include the edges LE of the contours.

In this regard, by using the median value M as the feature amount of the larger block LB and using the average value as the feature amount of the smaller block SB, edges of a local object in an image, such as the contours of the chest pocket PCs, may be specified even more accurately.

Moreover, as described with reference to FIG. 9A, the smaller blocks SB arranged in the medium image Is includes a first smaller block, e.g., the smaller block SB1b in FIG. 9A, and a second smaller block, e.g., the smaller block SB2a in FIG. 9A, which partly overlaps the first smaller block and through which an outline of the first smaller block extends. When the CPU 310 determines that at least one of the first smaller block and the second smaller block satisfies a condition for determination, e.g., {(M*N-)-T}>TH in the present embodiment, with reference to the feature amount, i.e., the median value M, of the larger block LB and the feature amount, i.e., the sum T of the brightness values, of the smaller block SB, the CPU 310 determines the first smaller block is a local edge region (S440-S455 in FIG. 7). Accordingly, when, for example, the local edges exist at a position along the outline of the first smaller block, the CPU 310 may reliably determine that the first smaller block is a local edge region. Therefore, the local edges may be restrained from being missed. For example, when a local edge exists at a boundary between the first smaller block Sb1*c* and the smaller block SB1*c* in FIG. 9A, there may be a case that some of the pixels forming the local edge may be included in the smaller block SB1*b* while the remainder part of the pixels forming the same local edge may be included in the smaller block SB1*c*. In such a case, neither the smaller block SB1*b* nor the smaller block SB1*c* may include a substantial number of pixels to form a local edge; therefore, neither the smaller block SB1*b* nor the smaller block SB1*c* may satisfy the condition for determination or may be determined as a local edge region. Meanwhile, when a local edge exists at a boundary between the first smaller block Sb1*b* and the smaller block SB1*c*, the local edge may be entirely included in the second smaller block SB2*a*. Therefore, the second smaller block SB2*a* may satisfy the condition and may be determined as a local edge region reliably. Thus, according to the present embodiment, when a local edge exists at a boundary between the first smaller block SB1*b* and the smaller block SB1*c*, the local edge may be restrained from being missed.

Moreover, according to the embodiment described above, the CPU 310 generates local edge image data in S320 (see FIG. 5), which indicates the pixels determined to form edges through the edge-detection process in S300 (see FIG. 5) as local edge pixels. Thus, the edge image data, in which the edges of a local object in the image are accurately specified, may be generated.

B. MODIFIED EXAMPLES

Examples modified from the embodiment described above will be described in the following paragraphs.

(1) In the embodiment described above, the printable area in the garment S may be specified with use of the local edge image data as the processed image data and the template image data. Meanwhile, the local edge image data may not necessarily be used to specify the printable area in the garment S alone but may be used in various purposes. For example, in order to specify a printable area in a sheet, local edge image data of scanned data, which may be obtained by scanning the sheet, may be used to specify a marker representing the printable area. For another example, in order to operate an industrial component through a robot, the industrial component may be determined in a captured image, and the local edge image data in the captured-image data may be used. For another example, not only for specifying an object in a captured image or a scanned image, but also in preparation for a local edge highlighting process, in which local edges in the captured image or the scanned image may be highlighted, the edges to be highlighted may be specified with use of the local edge image data.

(2) In the embodiment described above, the local edge image data is conclusively generated with use of the local edge region data and the plain edge image data (S320 in FIG. 5). Instead, for example, a pattern-matching process with use of the local edge region data as coarse edge image data. In this arrangement, matching accuracy may be lowered compared to the above embodiment; however, a matching speed may be improved.

(3) In the embodiment described above, the pre-matching process is applied to both of the medium image data and the partial sample image data to generate the processed medium image data and the template image data, which are used in the pattern matching. Instead, for example, the template image may be generated without being processed through the pre-matching process. For example, when the object to be specified is an industrial component as mentioned above, template image data representing the object drawn in lines may be generated with use of CAD data of the industrial component.

(4) In the embodiment described above, the median value M of the larger block LB is used as the feature amount of the larger block LB, and the sum T of the brightness values related to the average value of the smaller block SB is used as the feature amount of the smaller block SB. Instead, a different feature amount may be used. For example, a value related to an average value of the larger block LB may be used as the feature amount of the larger block LB. For another example, a value obtained from analysis of the histogram may be used as the feature amount. For another example, a peak value of a highest one of mountain portions in a histogram of the larger block LB may be used as the feature amount of the larger block LB, and an average value among peak values in one or more mountain portions having a height greater than a predetermined height in a histogram of the smaller blocks SB may be used as the feature amounts of the smaller blocks SB.

(5) For another example, arrangement of the larger blocks LB and the smaller blocks SB may not necessarily be limited to the arrangement in the embodiment described above. For example, the larger blocks LB and the smaller blocks SB may be arranged not to overlap one another. For another example, the larger block LB may be a block having a marked smaller block arranged at a center and being larger than the marked smaller block. For another example, in place of the larger block LB, a circular region containing a marked smaller block may be used.

(6) For another example, the template registration process in FIG. 3A and the printing process in FIG. 3B may not necessarily be conducted in the terminal device 300 but may be partly or entirely conducted in different device(s). For example, the CPU 210 in the printer 200 or a CPU in the image-capturing device 400 may conduct the template registration process shown in FIG. 3A and the printing process shown in FIG. 3B. In these arrangements, the terminal device 300 may be omitted. For another example, a server connected with at least one of the printer 200, the terminal device 300, and the image-capturing device 400 through the Internet may conduct the template registration process shown in FIG. 3A and the printing process shown in FIG. 3B. In this arrangement, the server may be a so-called cloud server configured with a plurality of computers that may communicate with each other.

(7) For another example, a part of the configuration in the embodiment and the modified examples described above achieved through hardware may optionally be achieved through software, or a part or an entirety of the configuration in the embodiment and the modified examples described above achieved through software may optionally be achieved through hardware.

When some or all of the functions in the present disclosure is achievable through a computer program, the program may be provided in a form of being stored in a computer-readable storage medium, e.g., a non-transitory storage medium. The program may be, when being used, stored in the same storage medium as or a different storage medium (computer-readable storage medium) from the storage medium when it was provided. The computer-readable storage medium may not necessarily be limited to portable storage media such as a memory card and a CD-ROM but may include an internal memory device in a computer and an external memory device connected to a computer such as a hard disk drive.

Although examples of carrying out the invention have been described, those skilled in the art will appreciate that there are numerous variations and permutations of the computer-readable storage medium, the image processing apparatus, and the method for image processing that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiments may merely be regarded as examples of the claimed subject matters.

What is claimed is:

1. A non-transitory computer readable storage medium storing computer readable instructions that are executable by a computer, the computer readable instructions, when executed by the computer, causing the computer to:
   obtain subject image data composing a subject image;
   set a plurality of larger regions and a plurality of smaller regions in each of the plurality of larger regions in the subject image with use of the subject image data, each of the plurality of smaller regions being smaller than the larger region in which the plurality of smaller regions are set, each of the plurality of larger regions including a plurality of pixels, each of the plurality of smaller regions including a plurality of pixels;
   calculate a first feature amount of each of the plurality of smaller regions and a second feature amount of each of the plurality of larger regions, the first feature amount being calculated with use of values of the plurality of pixels in each of the plurality of the smaller regions, the second feature amount being calculated with use of values of the plurality of pixels in each of the plurality of the larger regions;
   determine whether each of the plurality of smaller regions is an edge region including an edge based on a comparison between the first feature amount of the smaller region and the second feature amount of the larger region in which the smaller region is set; and
   generate edge image data indicating edges in the subject image with use of results of the determination whether each of the plurality of smaller regions is an edge region.

2. The computer readable storage medium according to claim 1,
   wherein the subject image data includes first image data composing a first image, and
   wherein the computer readable instructions, when executed by the computer, cause the computer to:
   set the plurality of larger regions and the plurality of smaller regions in each of the plurality of larger regions in the first image with use of the first image data,
   calculate the first feature amount of each of the plurality of smaller regions and the second feature amount of each of the plurality of larger regions set in the first image;
   determine whether each of the plurality of smaller regions in the first image is the edge region based on the comparison between the first feature amount of the smaller region and the second feature amount of the larger region in which the smaller region is set in the first image;
   generate first edge image data indicating edges in the first image with use of results of the determination whether each of the plurality of smaller regions is an edge region; and
   specify an object in the subject image by conducting pattern matching with use of the first edge image data and template image data, the template image data composing a template image corresponding to the object.

3. The computer readable storage medium according to claim 2,
   wherein the subject image data includes second image data composing an image including the object,
   wherein the computer readable instructions, when executed by the computer, cause the computer to:
   set the plurality of larger regions and the plurality of smaller regions in each of the plurality of larger regions in the image including the object with use of the second image data,
   calculate the first feature amount of each of the plurality of smaller regions and the second feature amount of each of the plurality of larger regions set in the image including the object;
   determine whether each of the plurality of smaller regions in the image including the object is the edge region based on the comparison between the first feature amount of the smaller region and the second feature amount of the larger region in which the smaller region is set in the image including the object; and
   generate second edge image data indicating edges in the image including the object with use of results of the determination whether each of the plurality of smaller regions is an edge region; and
   wherein the pattern matching is conducted with use of the second edge image data as the template image data.

4. The computer readable storage medium according to claim 1,
   wherein the first feature amount is a value related to an average value of the plurality of pixels in each of the plurality of smaller regions, and
   wherein the second feature amount is a value related to a median value of the plurality of pixels in each of the plurality of larger regions.

5. The computer readable storage medium according to claim 4,
   wherein the computer readable instructions, when executed by the computer, cause the computer to determine the smaller region is the edge region if a difference between the first feature amount of the smaller region and the second feature amount of the larger region, in which the smaller region is set, is larger than a criterion.

6. The computer readable storage medium according to claim 1,
wherein the plurality of smaller regions include a first smaller region and a second smaller region, the second smaller region partly overlapping the first smaller region and through which an outline of the first smaller region extends, and
wherein the computer readable instructions, when executed by the computer, cause the computer to determine the first smaller region is the edge region if at least one of the first smaller region and the second smaller region satisfies a condition for determination based on the first feature amount of the at least one of the first smaller region and the second smaller region and the second feature amount of the larger region, in which the first smaller region and the second region are set.

7. The computer readable storage medium according to claim 1,
wherein the computer readable instructions, when executed by the computer, cause the computer to:
determine whether each pixel in the subject image is a pixel forming an edge with use of the subject image data, and
generate the edge image data indicating the pixels, which are determined as the pixels forming the edges in the subject image and are included in the smaller regions determined as the edge regions, as edge pixels.

8. An image processing apparatus, comprising:
a memory configured to store data, and
a controller configured to:
obtain subject image data composing a subject image;
set a plurality of larger regions and a plurality of smaller regions in each of the plurality of larger regions in the subject image with use of the subject image data, each of the plurality of smaller regions being smaller than the larger region in which the plurality of smaller regions are set, each of the plurality of larger regions including a plurality of pixels, each of the plurality of smaller regions including a plurality of pixels;
calculate a first feature amount of each of the plurality of smaller regions and a second feature amount of each of the plurality of larger regions, the first feature amount being calculated with use of values of the plurality of pixels in each of the plurality of the smaller regions, the second feature amount being calculated with use of values of the plurality of pixels in each of the plurality of the larger regions;
determine whether each of the plurality of smaller regions is an edge region including an edge based on a comparison between the first feature amount of the smaller region and the second feature amount of the larger region in which the smaller region is set; and
generate edge image data indicating edges in the subject image with use of results of the determination whether each of the plurality of smaller regions is an edge region.

9. A method to process images, comprising:
obtaining subject image data composing a subject image;
setting a plurality of larger regions and a plurality of smaller regions in each of the plurality of larger regions in the subject image with use of the subject image data, each of the plurality of smaller regions being smaller than the larger region in which the plurality of smaller regions are set, each of the plurality of larger regions including a plurality of pixels, each of the plurality of smaller regions including a plurality of pixels;
calculating a first feature amount of each of the plurality of smaller regions and a second feature amount of each of the plurality of larger regions, the first feature amount being calculated with use of values of the plurality of pixels in each of the plurality of the smaller regions, the second feature amount being calculated with use of values of the plurality of pixels in each of the plurality of the larger regions;
determining whether each of the plurality of smaller regions is an edge region including an edge based on a comparison between the first feature amount of the smaller region and the second feature amount of the larger region in which the smaller region is set; and
generating edge image data indicating edges in the subject image with use of results of the determination whether each of the plurality of smaller regions is an edge region.

\* \* \* \* \*